Figure 1:
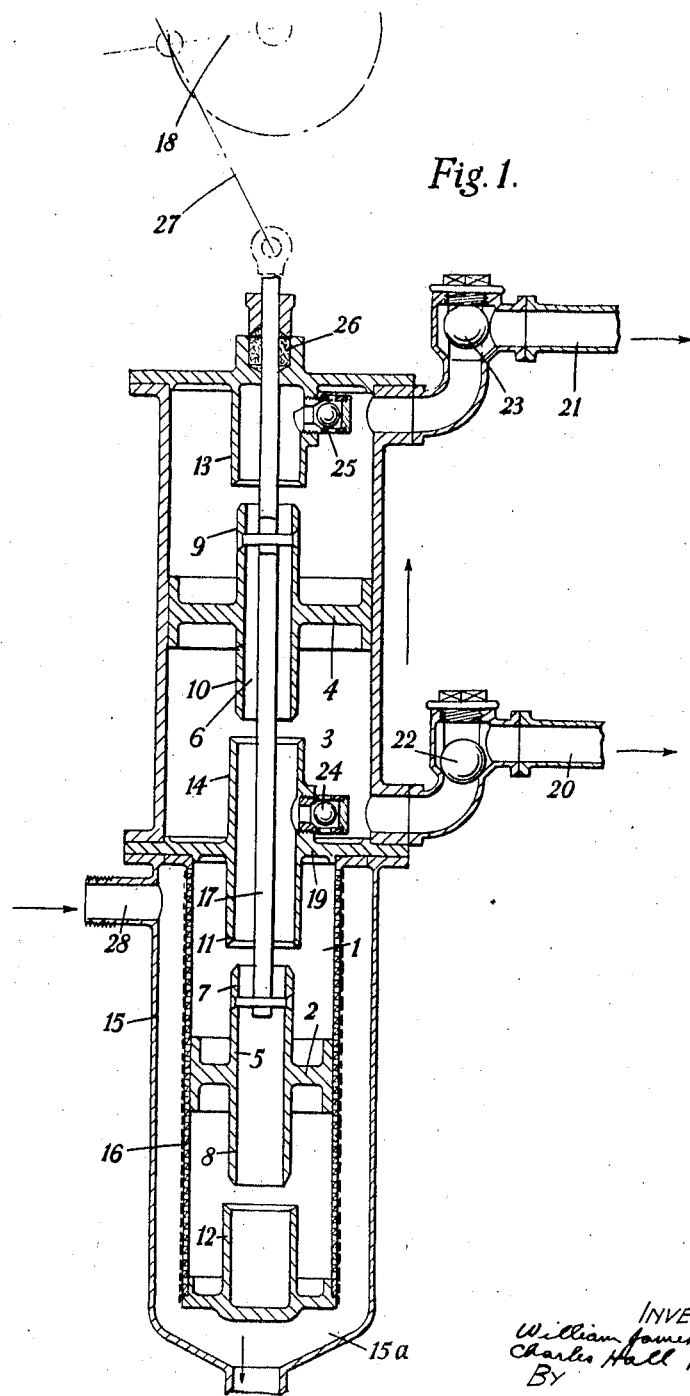

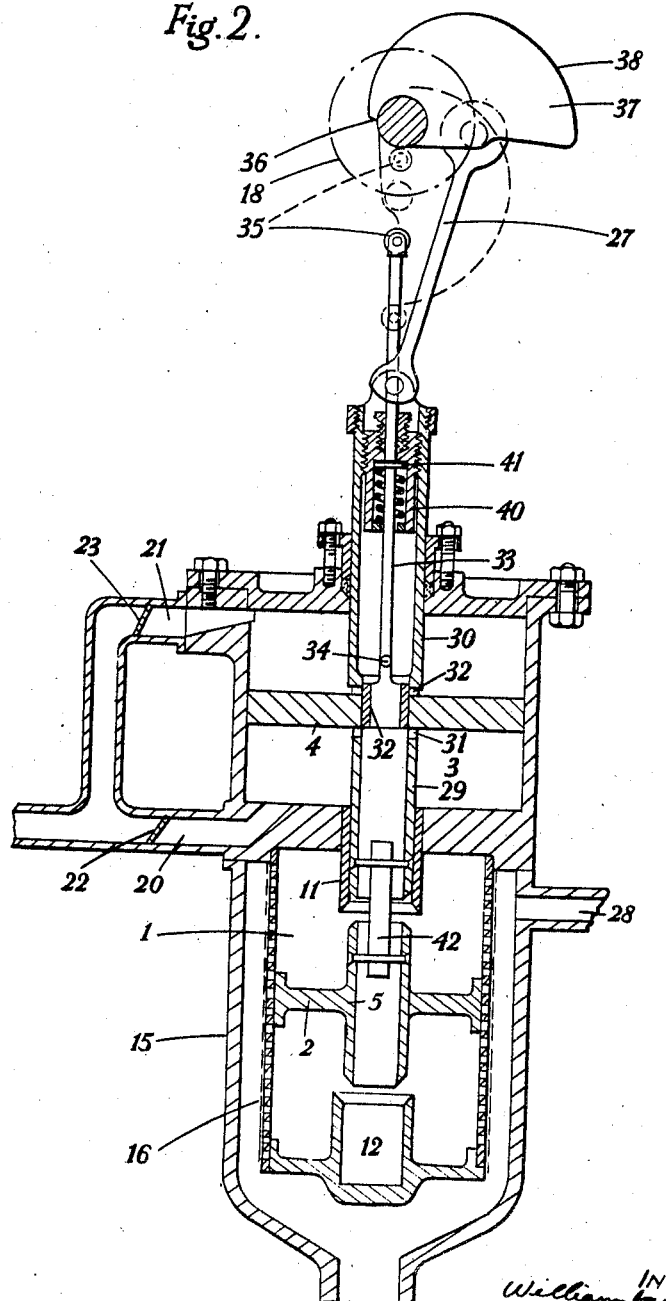

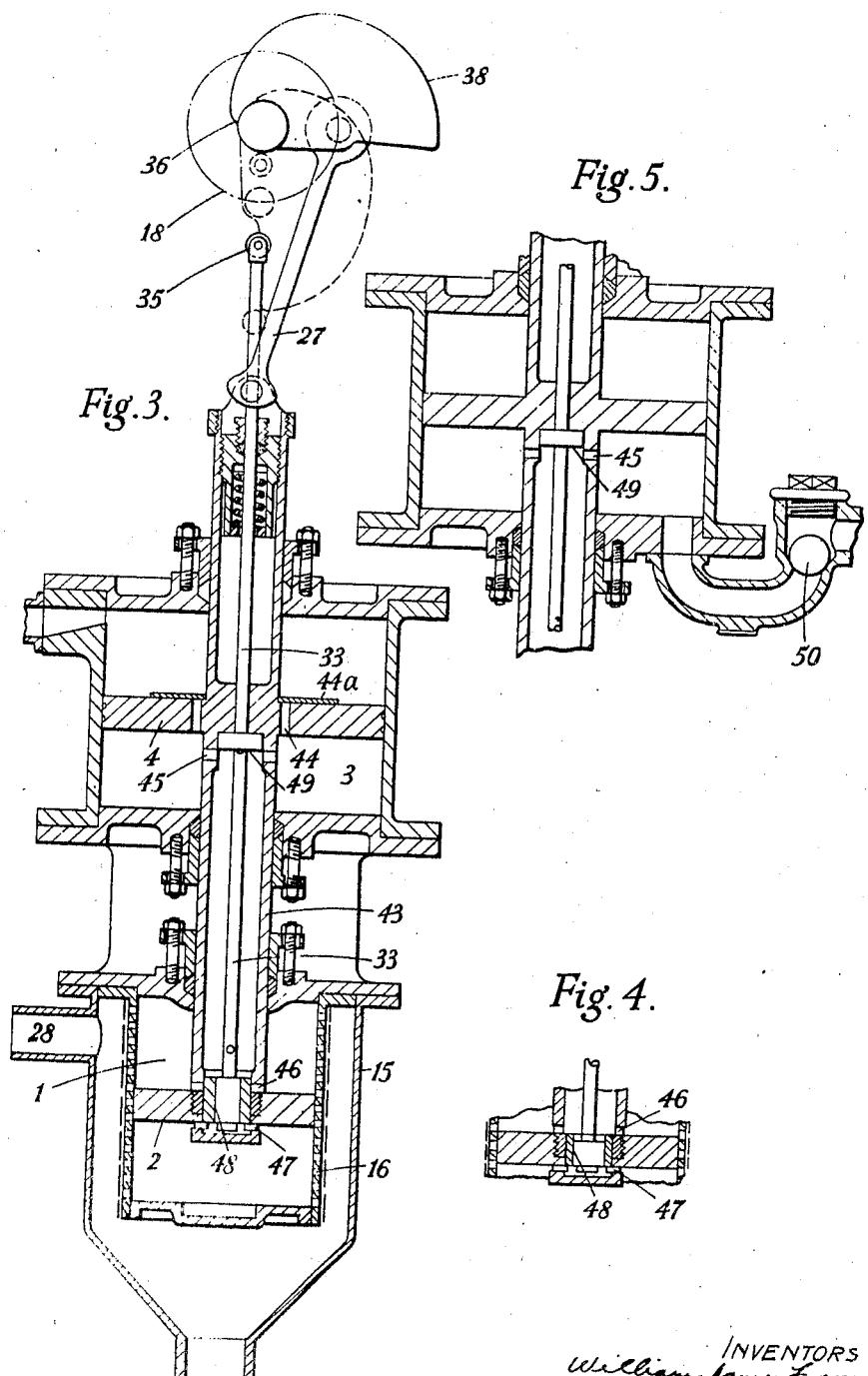

Patented Jan. 4, 1944

2,338,419

UNITED STATES PATENT OFFICE 2,338,419

FILTERING AND LIKE TREATMENT OF FLUIDS

William James Forrest, Ilford, and Charles Hall Brown, Catford, London, England

Application July 8, 1941, Serial No. 401,424
In Great Britain July 25, 1940

8 Claims. (Cl. 210—167)

The present invention relates to the filtering or straining of fluids, more especially to obtain a clean liquid filtrate from liquids, e. g., viscous liquids such as oils, paints, varnishes or other liquids containing pigments, powders, crystals or other solid matter in suspension in a finely divided state, but it can be used for the filtering or straining of other liquids or of dust-laden or powder-containing gases, vapours or the like. The passing of some liquids, such as varnishes and oils, through separating surfaces is sometimes termed "refining" and it is to be understood that the term "filtering" used herein is intended to cover such treatments. In the following description, the filtering or straining means which may be gauze, (e. g., of metal) silk, cloth, paper, washleather or other material or may be slots or the like produced by finely spaced plates or coiled wires or by other suitable means is termed "filtering medium".

The object of the present invention is to provide an improved means for assisting the filtration and cleaning the filtering medium. The invention also aims to do this without introducing foreign material into the fluid being treated and without involving waste of the filtrate.

We have claimed in our prior application Serial No. 320,016 a filtering or straining apparatus comprising a filtrate chamber containing a reciprocating plunger and axially communicating with a co-axial reciprocating plunger pump and valve means operative in such a manner as to permit the pump to aid the drawing of filtrate through the filtering medium whilst a part of the filtrate is being forced by the chamber plunger back through the filtering medium for cleaning the latter and another part is being forced by the pump plunger out of the pump cylinder to discharge, and the present invention relates to certain improvements in or modifications of our aforesaid invention. According to one feature of these improvements we have now developed a form of construction in which as a part of the valve means one of the plungers itself serves as a valve, so operating that during its movement in either direction it closes the space in the chamber in advance of it and opens the space in the chamber behind it, e. g., by providing the plunger with a central tubular part extending axially of the chamber on each side of the plunger and arranged to co-operate with projections extending inwardly from each end of the chamber. We have hereinafter illustrated one form of apparatus in which the plunger in the filtrate chamber serves as a valve in the manner described and another form in which the plungers in both chambers serve as valves, in the latter case the one plunger acting to force filtrate through the filtering medium whilst drawing in through the filtering medium fresh filtrate behind it and the other plunger acting to force filtrate to discharge whilst also drawing in filtrate from the filtrate chamber.

In this latter form, each plunger may be provided on each side with an axial tubular extension and each end of the plunger chamber provided with a co-operating inward projection, the projections at the adjacent ends of the respective chambers being formed by a tube which places the two chambers in communication and the plungers being connected by a rod which passes through such tube so that in the course of one stroke one side of the pump plunger is placed in communication with one side of the cleaning plunger whilst the opposite sides are closed for forcing filtrate back through the filtering medium for cleansing and out of the pump chamber for discharge, the return stroke placing the opposite sides of the two plungers in communication while the spaces on the other side are closed from each other for cleansing and discharge.

The projection at the end of the pump chamber remote from the filter itself may be of tubular form and this tubular projection and the one at the other end of the pump chamber may be provided near the adjacent end wall of the chamber with a non-return valve which closes when the pump is discharging from that end and opens as soon as the plunger commences its return stroke and before the plunger valve itself leaves the inner end of the projection.

The forms hereinbefore referred to simplify the construction in certain respects. It will be noted for instance that if the plunger in each chamber serves as a valve the externally operater valve mechanism can be eliminated. Furthermore the stuffing boxes which are necessary when the plunger rod slides through holes in the adjacent end walls of the chambers can be obviated. Similarly to the apparatus described in the main patent, the present apparatus may be such as to permit the cleansing and pump plungers to be rested without interfering with filtration over the whole filtering surface, except that covered by the cleansing plunger.

In the preferred construction described in the main patent the pump plunger both discharges and draws in fresh filtrate during each stroke so that, disregarding the momentary pause during the reversal of the plunger stroke, the pump plunger is continually aiding filtration and discharging. Another feature of the present improvements is that the pump is so valve controlled as to permit the plunger intermittently to aid the drawing of filtrate through the filtering medium and to promote the discharge of the filtrate. Cleansing by the action of the plunger in the filtrate chamber may proceed continuously or it may go on intermittently while the pump is operating and the processes of aiding the filtration and promoting discharge by the pump and cleansing need not proceed together at any time but for example, the drawing of filtrate into the pump chamber and the discharge of filtrate therefrom may proceed simultaneously at each alternate stroke and the cleansing action of the plunger in the filtrate chamber may be confined to the non-effective stroke of the pump plunger. Alternatively one stroke of the pump plunger may serve to draw in filtrate from the filtrate chamber and the next stroke to discharge filtrate therefrom and if desired cleansing may be continuous or the cleansing apparatus may be so valve-controlled that cleansing takes place only during the suction stroke of the pump plunger; the cleansing action may thus only occur when the pump is being less heavily worked.

In order that the invention may be more readily understood, reference is hereinafter made to the accompanying drawings, in which various forms of construction according to the present improvements are illustrated.

Fig. 1 of these drawings is a sectional elevation through one form in which both plungers act as valves and Fig. 2 is a sectional elevation of another form in which only the plunger in the filtrate chamber so acts and the valve control of the pump is similar to that described in the main patent. Fig. 3 is a similar elevation of another form in which the pump is single acting in the sense that it does not discharge or draw-in at each stroke. Fig. 4 is a detail view of a modification of this construction to confine the cleansing action to the non-effective stroke of the pump plunger. Fig. 5 is a fragmentary sectional elevation of a modified form of the single-acting pump type of construction and the rest of the apparatus may be similar to that described in Figs. 3 or 4.

In the form of apparatus shown in Fig. 1, the filtrate chamber 1 contains a reciprocating plunger 2 (hereinafter termed the cleansing plunger) and this chamber communicates axially with a coaxial chamber 3 containing a plunger 4 which serves as a pump to facilitate filtration and discharge. Each plunger is made hollow by the provision of a central tube 5, 6 which projects on each side of the plunger and thereby provides hubs 7, 8, 9, 10 which serve as sleeve valves arranged to co-operate with fixed portions 11, 12, 13, and 14.

The filtrate chamber is surrounded by a receiving vessel 15 for the crude material and is so disposed in the receiver that the sludge or dross can separate out by gravity, the receiver for this purpose extending below the filtering drum 16 and collecting the sludge in the sump 15a when the sludge is heavier than the filtrate. The sludge may be continuously or intermittently withdrawn. The receiver is shut off from the pump chamber except by way of the filter drum and the two plungers are connected by a central rod 17 passing with ample clearance from within the tube 5 through the central tube formed by the hubs 11 and 14 and through the central tube 6 of the pump plunger to a crank device 18 (shown diagrammatically in Fig. 1) externally of the pump. The fixed valve portions 11 to 14 are arranged to protrude axially into the pump and filtrate cylinders at each end of the latter, the two remote portions 12 and 13 forming sockets with the remote end walls of the respective cylinders whilst the other two provide the axial communication between the cylinders by way of a single passage through a common wall 19 between the cylinders. The pump and filtrate cylinders need not be separated by a common wall but could have separate spaced walls. The hollow hubs 7 to 10 are of sufficient length that when the rod is raised or lowered from the position in which the plungers are in a medial or approximately medial and neutral position one hollow hub of each plunger soon reaches its co-operating fixed portion of the valve means. This arrangement is chosen in the form illustrated because the two plungers may be held in a neutral position in which all the valves are opened and the filtrate can pass out of two discharge outlets 20, 21, from the pump cylinder so that filtration can proceed without cleansing and without the aid of the pump, provided of course that there is sufficient pressure on the crude material or suction at the outlet from the pump to carry the fluid through the apparatus. In such a case the setting into operation of the plungers may be effected periodically at such times as the filtering medium requires to be cleaned. The plungers may however be at work continuously in which case filtration and cleansing proceed together and if the apparatus is not required to have idle periods of the plungers, one hub of each plunger may always be in co-operation with one or other of the fixed portions of the corresponding cylinder.

The outlets 20, 21 contain non-return valves 22, 23 which open by the pressure of the filtrate. The outlets may lead to a common discharge pipe. If the plungers are kept in the neutral position the filtrate will issue into the pump cylinder from the filtrate chamber through the fixed central sleeve and thence through the lower or upper outlets.

When the plungers commence to move from their neutral medial position for cleansing the filtering medium, the leading hollow hubs thereof soon close off the chambers in advance of the plungers by each such hub entering with a close fit into the fixed sleeve portion towards which it is moving, or where practicable by its fitting closely around such portion, with the result that the filtrate in advance of the cleansing plunger is forced back through the filtering medium whilst that in advance of the pump plunger forces open the non-return valve in the corresponding outlet from the pump cylinder and discharges. In the space behind the pump plunger the filtrate is drawn in from the space behind the cleansing plunger, the other outlet from the pump cylinder then being closed by the suction on the non-return valve, and during the return stroke of the plungers when the other hub of each plunger has moved into co-operation with the opposite fixed sleeve portion, the filtrate previously drawn in the pump cylinder is forced out by the way of the outlet which was previously closed whilst the filtrate which has been previously collected in the filtrate chamber is forced out through the other end portion of the filtering medium for cleansing the latter.

Since one or other of the hollow hubs of the pump plungers is in co-operative engagement with one or other of the corresponding fixed sleeve portions during a substantial part of the plunger movement the space in the pump cylinder which has been closed for the discharge of the filtrate would ordinarily remain closed during a substantial initial part of the return stroke of the plunger and in order to obviate this and to permit the flow into the chamber behind the plunger to occur before the now-trailing hollow hub has left the fixed sleeve portion, the sleeve portion at each end of the pump chamber may be provided with a non-return valve 24, 25 arranged as near as possible to each end wall of the pump cylinder and so arranged as to close during the pressure stroke towards that end and to open on the suction stroke from such end.

The non-return valves may be ball valves, as shown, flap or like valves.

The rod to which the plungers are connected may pass through a stuffing box 26 in the outer end wall of the pump cylinder and then be coupled by a connecting rod 27 to the crank 18 in such a manner that the plunger can move to an equal extent on either side of its medial position in the cylinder.

It is generally preferable to make the pump cylinder of greater diameter than the filtrate cylinder so that for equal movements of the respective plungers a greater volume is displaced by the pump plunger in order to assist the displacement of filtrate from the filtrate chamber to the pump cylinder. The difference between the respective volumes may be varied according to the materials being treated or the fineness of the filtering medium. For example for treating oil with a small dirt content a relatively larger pump capacity could be used than for treating viscous oil with a high dirt content. The same constructional form of apparatus may be used for different materials by fitting liners into the pump cylinder to diminish its capacity when treating materials which do not flow so readily through the filtering medium and behind the plungers, and using an appropriately smaller pump plunger, the filtrate chamber and plunger remaining unaltered. In some cases, especially when dealing with materials which flow very slowly through the filtering medium, it may be desirable to use a pump of smaller capacity than that of the filtrate cylinder and plunger.

In the particular form described, the pump cylinder is arranged vertically over the filtrate chamber and the receiver is of cylindrical form and is flanged and bolted to a bottom flange on the pump cylinder. The inlet 28 to the receiver 15 is near the top and the sludge sump is at the bottom and may be valve controlled. The receiver can be dispensed with however and the apparatus, or at least the filtering medium, submerged in a mass of crude material to be filtered.

In the modified form of construction shown in Fig. 2 the valve system controlling the pump is modified along the lines of that adopted in the main patent. The pump plunger is provided with a depending tube 29 and this and the hollow plunger rod 30 are apertured at 31 and 32 respectively adjacent each face of the plunger and with these apertures a sleeve valve 32a co-operates. The valve 32a is carried by the end of a rod 33 through the mediation of spider 34 and the upper end of the rod is provided with a roller 35 which when at its upper position (shown in dotted outline) is engaged by the sharp portion 36 of the cam 37 when the pump plunger is near the end of its upward stroke and the cam periphery 38 is so shaped as to hold the rod in that position in relation to the plunger until the plunger reaches the other end of the cylinder when the spring 40 acting on the collar 41 is permitted by the travel of the cam past the roller to lift the valve rod in order to close the open aperture and expose the other aperture. The plungers may be connected by the rod 42.

In the forms hereinbefore described the valve means so operate that in two successive strokes first one side of the pump plunger is placed in communication with one side of the cleansing plunger while the spaces on the other side of the plungers are closed from each other and then the other side of the pump plunger is placed in communication with the other side of the cleansing plunger while the spaces on the first side of each plunger are closed from each other. In the case of the apparatus shown in Fig. 1 there is a period during which each side of the pump plunger is open to each side of the cleansing plunger.

In the further modification shown in Fig. 3, the pump plunger is single acting. The filtrate chamber 1 and the pump chamber 3 are in axial communication by way of a hollow rod 43 connecting the two plungers and one or more apertures 44 are provided in the pump plunger which are closed by a non-return valve 44a. The hollow plunger rod is ported at 45 on the filtering side of the plunger and also on each side of the cleansing plunger at 46 and 47, the hollow rod being closed from the pump chamber where it projects beyond the other side of that plunger. A sleeve valve 48 is carried on the end of an extended rod 33 which passes through the plunger 4 and the hollow plunger rod to the exterior of the apparatus, and this rod is operatable at each end of the stroke of the plunger by the cam mechanism as described in connection with Fig. 2. Therefore first the space on one side and then that on the other side of the cleansing plunger is placed in communication with the interior of the hollow rod. The port 45 in the hollow rod adjacent the pump plunger is arranged to be closed during each alternate stroke by a collar 49 (or a sleeve) on the valve rod 33. In whichever direction the plungers are moving, the filtrate in advance of the cleansing plunger is forced back through the cleansing medium. During one stroke of the pump plunger the adjacent port 45 in the hollow rod is open while the non-return valve 44a closes the openings 44, thereby permitting a charge to be drawn into the pump cylinder and during the return stroke the port 45 is closed by the collar 49 and the filtrate previously drawn in is forced through the plunger and past the non-return valve to the other side of the plunger for discharge during the next stroke when a fresh supply of filtrate is being drawn into the pump.

The valve apparatus controlling the cleansing apparatus may be modified as shown in Fig. 4 so that the sleeve 48 leaves open the ports 46 and 47 on both sides of the cleansing plunger while the pump is working with the stroke which draws in and discharges and the cleaning of the filtering medium is effected during the non-effective stroke of the pump plunger by closing off the opening 47 by the sleeve valve during such non-effective stroke of the pump plungers.

Fig. 5 shows another modification in which the pump is single acting, the apparatus being generally the same as that shown in Figs. 3 or 4 but being so arranged that no flow through the piston can take place. The hollow plunger rod is ported at 45 and the valve rod is provided with a collar 49 as in the previously described form and this collar closes the port 45 during one stroke viz., the down stroke in the example shown, and opens such port on the return stroke. Thus fluid can be drawn in through the port 45 during the upward stroke of the plunger and discharged past a non-return valve 50 during the down stroke. The space in the chamber above the plunger may be vented by a hole in the top wall of the pump. We do not recommend using this form where the mixture of air with the filtrate is undesirable.

What we claim is:

1. A filtering or straining apparatus comprising a filter cylinder having end walls and a filtering wall between said end walls providing the inlet to said cylinder, a plunger in said cylinder, a cylinder co-axial with said filter cylinder and a plunger in said second cylinder forming therewith a pump, means connecting said plungers and means to displace them in the same direction, said plungers each having axial tubular portions projecting from each side thereof and thereby providing communication with the respective cylinder on opposite sides of the plunger, and said cylinders having at each end means with which said tubular portions are engageable in a telescopic manner during the respective forward and return strokes to close off communication from the filter wall through the said tubular portions to that part of the cylinders in advance of the plungers, said means at the adjacent ends of the cylinders being interconnected and tubular and thereby providing communication between the cylinders to permit the pump to draw filtrate from the filter cylinder, said pump cylinder having outlet means for the escape of fluid placed under pressure by the plunger therein.

2. A filtering or straining apparatus comprising a filter cylinder having end walls and a filtering wall between said end walls providing the inlet to said cylinder, a plunger in said cylinder, a cylinder co-axial with said filter cylinder and a plunger in said second cylinder forming therewith a pump, means connecting said plungers and means to displace them in the same direction, at least one of said plungers having axial tubular portions projecting from each side thereof and thereby providing communication with the respective cylinder on opposite sides of the plunger and the corresponding cylinder having at each end, means with which said plunger tubular portions are engageable in a telescopic manner to close off communication through the said tubular portion of the plunger to the part of the cylinder in advance of the plunger, said means at the end of the cylinder adjacent the other cylinder being tubular and connected to the said second cylinder thereby providing communication between the cylinders to permit the pump to draw filtrate from the filter cylinder and said pump cylinder having outlet means, means closing said outlet means against the escape of the filtrate which is being drawn into the pump cylinder, said closing means being adapted to open for the escape of fluid placed under pressure by the plunger on the reverse stroke of the plungers.

3. A filtering or straining apparatus comprising a filter cylinder having end walls and a filtering wall between said end walls providing the inlet to said cylinder, a plunger in said cylinder, a cylinder co-axial with said filter cylinder and a plunger in said second cylinder forming therewith a pump, means including a hollow rod connecting said plungers and extending through the pump cylinder into the filter cylinder, means to displace said rod and said plungers, said hollow rod having an opening in the portion thereof which extends into the filter cylinder thereby placing the interior of said rod in communication with that end of the filter cylinder nearer the pump cylinder and said hollow rod having at least one other opening in the other portion thereof on one side of said pump cylinder plunger placing the interior of said rod in communication with that portion of the pump cylinder on the said side of the plunger, said end of the filter cylinder which is nearer the pump cylinder, having a portion with which that portion of the rod which extends into the filter cylinder is engageable in telescopic fashion to close off said first opening and thereby said communication, said filter plunger having a portion projecting from the side thereof remote from the pump cylinder, the end of said filter cylinder remote from the pump cylinder having a co-operating portion which is engageable by said plunger projecting portion in a telescopic manner to close off communication through said plunger from said remote end of said filter cylinder, and means for closing said opening between the hollow rod and the pump cylinder to prevent fluid displaced by the pump plunger from returning through the rod, and outlet means from the pump cylinder for the escape of such fluid.

4. Filtering or straining apparatus according to claim 1, in which the means at each end portion of the pump cylinder with which the tubular plunger portions engage is a tubular portion projecting into the pump cylinder and each of said tubular projecting portions is provided with a non-return valve in its wall near to the end wall of the cylinder, each of said valves closing under pressure prevailing in said cylinder and opening under suction therein.

5. In a filtering or straining apparatus comprising a filter cylinder having end walls, a filtering wall between said end walls providing the inlet to said cylinder and a plunger in said cylinder adapted to return filtrate through the filtering wall for cleaning it, the combination of a cylinder co-axial with said filter cylinder and a plunger in said second cylinder forming therewith a pump, means including a hollow rod connecting said plungers, means to displace said rod and said plungers so as to form a suction compartment in each cylinder, porting means for providing communication between the interior of said hollow rod and the said compartments on the forward stroke of the plungers, valve means associated with said porting means and means for displacing said valve means to close said porting means thereby to close off said pump compartment from the filter compartment by way of said hollow rod during the return stroke, said pump compartment having an outlet and further valve means therein adapted to open said outlet when the fluid in said compartment is placed under pressure by the pump plunger during said return stroke.

6. A filtering or straining apparatus according to claim 5, in which said porting means comprises a port communicating between the interior of the hollow rod and one side of said plunger in the filter cylinder, and also a port communicating between said interior and the other side of said plunger, said valve means being arranged to close one of said ports but not the other during one stroke of the pump plunger and said valve displacing means operating to effect opening of the said first port and to close said second port during the return stroke of the plungers.

7. In a filtering or straining apparatus comprising a filter cylinder having end walls, a filtering wall between said end walls providing the inlet to said cylinder and a plunger in said cylinder adapted to return filtrate through the filtering wall for cleaning it, the combination of a cylinder co-axial with said filter cylinder and a plunger in said second cylinder forming therewith a pump, means including a hollow rod connecting said plungers, means to displace said rod and said plungers so as to form a suction compartment in each cylinder on a forward stroke of the plungers, porting means for providing communication between the interior of said hollow rod and the said compartment during a forward stroke of the plungers, normally open valve means associated with said porting means and means for displacing said valve means on a return stroke of the plungers to close said ports thereby to close off said pump cylinder compartment from the filter compartment, said pump compartment having a discharge outlet, and a non-return valve in said outlet operable to open when the filtrate in said compartment is placed under pressure by the pump plunger during its return stroke.

8. In a filtering or straining apparatus according to claim 5, said outlet means comprising a port through said pump plunger and a valve closing said port, and said pump cylinder having a discharge opening on that side of the plunger which is opposite the suction compartment, said valve being adapted to open the plunger port to allow fluid to flow through the plunger on its return stroke thereof.

WILLIAM JAMES FORREST.
CHARLES HALL BROWN.